(12) United States Patent
Munteanu

(10) Patent No.: US 11,054,960 B1
(45) Date of Patent: Jul. 6, 2021

(54) FUZZY TARGET SELECTION FOR ROBOTIC PROCESS AUTOMATION

(71) Applicant: UiPath Inc., New York, NY (US)

(72) Inventor: Dan V. Munteanu, Bucharest (RO)

(73) Assignee: UiPath Inc., New York, NY (US)

( * ) Notice: Subject to any disclaimer, the term of this patent is extended or adjusted under 35 U.S.C. 154(b) by 87 days.

(21) Appl. No.: 16/730,198

(22) Filed: Dec. 30, 2019

(51) Int. Cl.
*G06F 3/0481* (2013.01)
*G06F 3/0484* (2013.01)
*G06F 9/30* (2018.01)
*G06F 9/451* (2018.01)
*G06N 5/04* (2006.01)

(52) U.S. Cl.
CPC ........ *G06F 3/0481* (2013.01); *G06F 3/04842* (2013.01); *G06F 9/3017* (2013.01); *G06F 9/451* (2018.02); *G06N 5/048* (2013.01)

(58) Field of Classification Search
CPC .... G06F 3/0481; G06F 9/451; G06F 3/04842; G06F 9/3017; G06N 5/048
USPC .......................................................... 345/156
See application file for complete search history.

(56) References Cited

U.S. PATENT DOCUMENTS

| | | | |
|---|---|---|---|
| 9,928,106 B2 * | 3/2018 | Hosabettu | ............. G06F 9/4843 |
| 9,965,139 B2 | 5/2018 | Nychis et al. | |
| 10,365,799 B2 * | 7/2019 | Hosbettu | ............... G06T 7/0085 |
| 10,474,564 B1 | 11/2019 | Konyshev et al. | |
| 10,885,423 B1 * | 1/2021 | Voicu | ...................... G06N 3/004 |
| 2017/0228119 A1 * | 8/2017 | Hosbettu | ................ G06Q 10/00 |
| 2018/0322004 A1 | 11/2018 | Jain et al. | |
| 2020/0073686 A1 | 3/2020 | Hanke et al. | |

OTHER PUBLICATIONS

Ranorexpath, "RanoreXPath examples", pages from web-based RanoreXPath user guide, downloaded on Dec. 20, 2019 from https://www.ranorex.com/help/latest/ranorex-studio-advanced/ranorexpath/ranorexpath-syntax-examples/.
Chrome, "Chrome.debugger", pages from Chrome, downloaded on Dec. 20, 2019 from https://developer.chrome.com/extensions/debugger.
Rapise, "Self-healing Web Locators", downloaded on Dec. 20, 2019 from https://rapisedoc.inflectra.com/Guide/web_self_healing/.

\* cited by examiner

*Primary Examiner* — William D Titcomb
(74) *Attorney, Agent, or Firm* — Law Office of Andrei D Popovici, PC

(57) ABSTRACT

A software robot is designed to carry out an activity (e.g., a mouse click, a text input, etc.) on a target element (e.g., a button, an input field, etc.) of a user interface. The robot is configured to automatically identify the target element at runtime according to a set of attributes of the target element specified in the source-code of the user interface. The robot's code specification includes an indicator of a selected fuzzy attribute and a numerical similarity threshold indicative of an acceptable degree of mismatch between design-time and runtime values of the respective fuzzy attribute. The robot is configured to identify the target element from a set of candidates which are sufficiently similar to it according to the specified degree of mismatch.

23 Claims, 12 Drawing Sheets

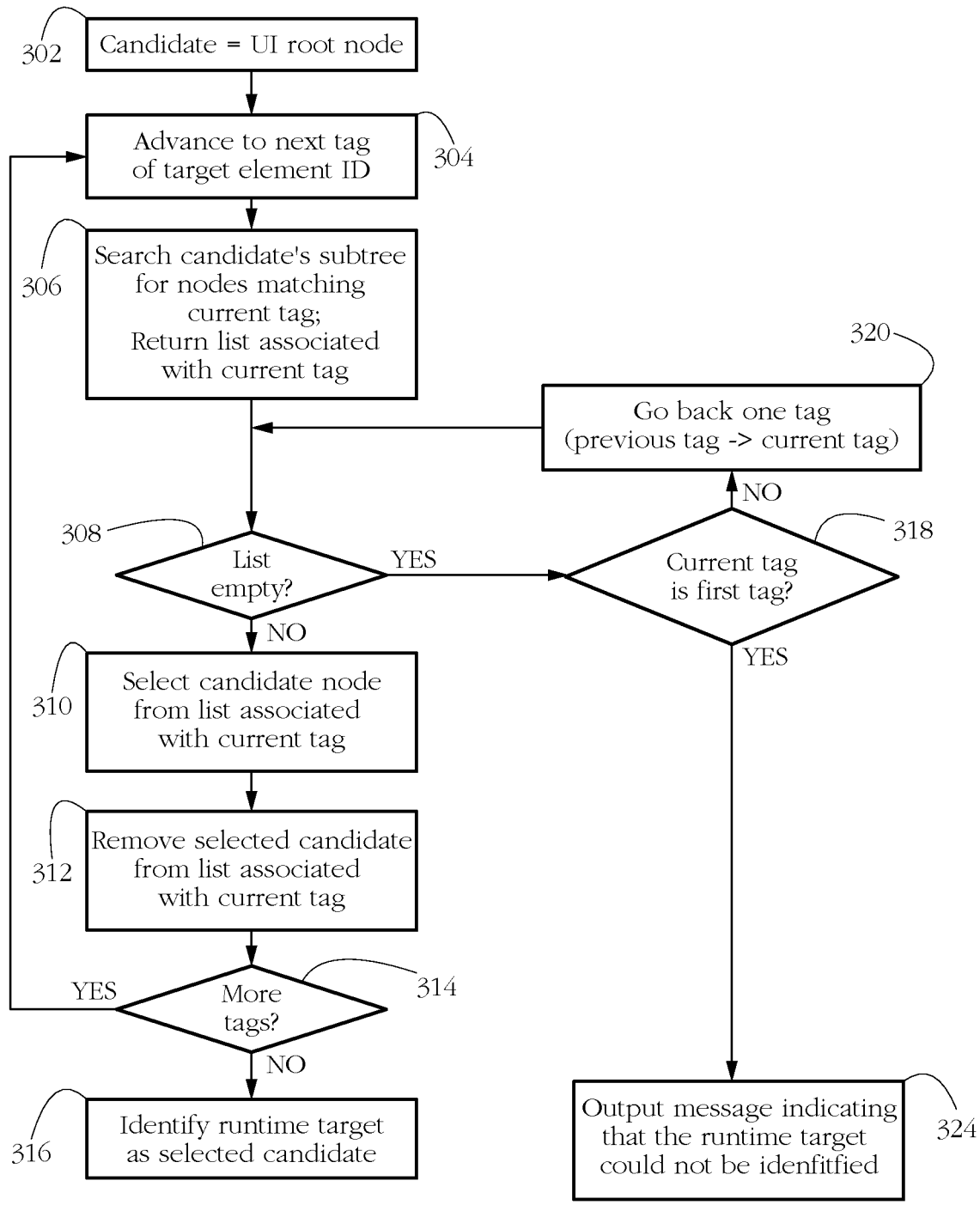
FIG. 8-A

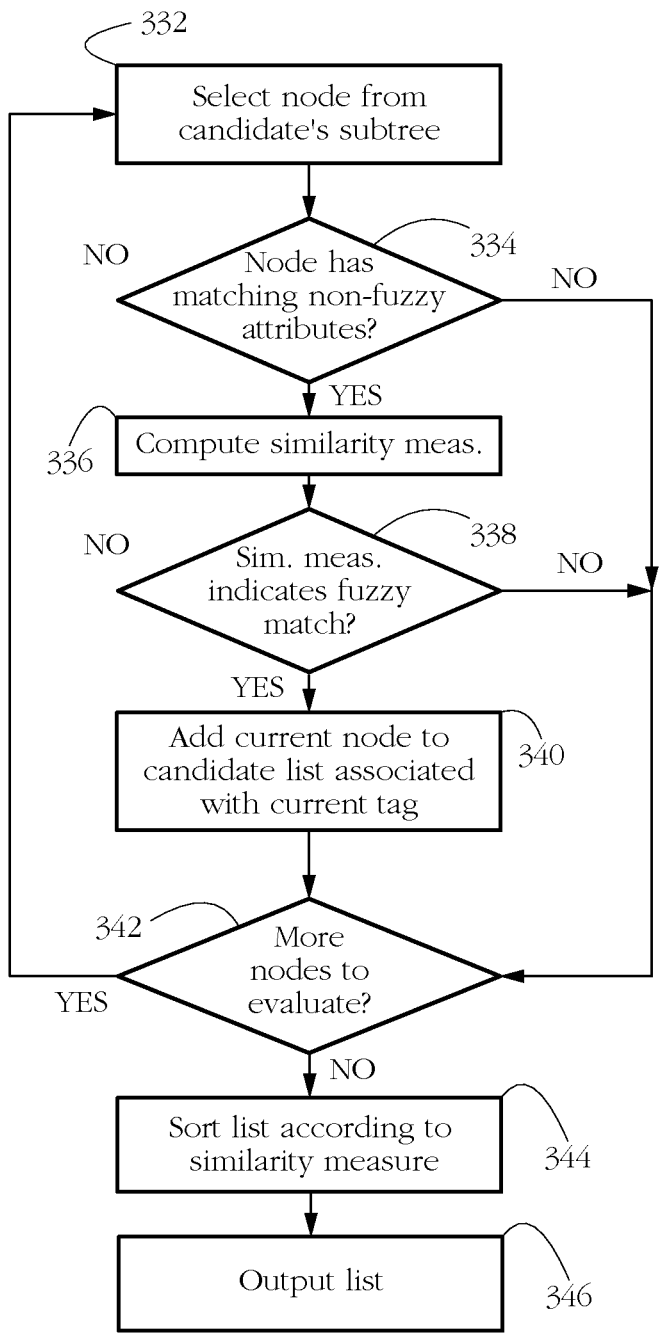
FIG. 8-B

FUZZY TARGET SELECTION FOR ROBOTIC PROCESS AUTOMATION

BACKGROUND

The invention relates to robotic process automation (RPA), and in particular to systems and methods for automatically identifying a user interface element targeted for an activity such as a mouse click or a text input.

RPA is an emerging field of information technology aimed at improving productivity by automating repetitive computing tasks, thus freeing human operators to perform more intellectually sophisticated and/or creative activities. Notable tasks targeted for automation include extracting structured data from documents, and interacting with user interfaces, for instance to fill in forms, among others.

A distinct prong of RPA development is directed at simplifying the programming and management of software robots, with the ultimate goal of extending the reach of RPA technology to users that lack advanced programming skills or training. One way of making RPA more accessible is the development of RPA-oriented integrated development environments (IDEs) which allow the programming of robots via graphical user interface (GUI) tools, instead of text-based coding.

However, automating the interaction with a user interface poses substantial technical challenges.

SUMMARY

According to one aspect, a method comprises employing at least one hardware processor of a computer system, in response to receiving a robotic process automation (RPA) script comprising a target element ID characterizing a target element of a target user interface (UI), to automatically identify a runtime instance of the target element within a runtime UI exposed by the computer system, the runtime instance of the target element identified according to the element ID. The method further comprises automatically carrying out an operation that reproduces a result of an interaction of a human operator with the runtime instance of the target element, the operation determined according to the RPA script. The target element ID comprises a plurality of attribute-value pairs collectively indicating a position of the target element within a tree representation of the target UI, a selected attribute of the plurality of attribute-value pairs having a target value. Automatically identifying the runtime instance of the target element comprises comparing the target value with a value of the selected attribute characterizing a candidate element of the runtime UI, the comparison performed according to a similarity threshold. Automatically identifying the runtime instance of the target element further comprises identifying the candidate element as the runtime instance of the target element according to a result of the comparison.

According to another aspect, a computer system comprises at least one hardware processor configured, in response to receiving a robotic process automation (RPA) comprising a target element ID characterizing a target element of a target user interface (UI), to automatically identify a runtime instance of the target element within a runtime UI exposed by the computer system, the runtime instance of the target element identified according to the element ID. The at least one hardware processor is further configured to automatically carry out an operation that reproduces a result of an interaction of a human operator with the runtime instance of the target element, the operation determined according to the RPA script. The target element ID comprises a plurality of attribute-value pairs collectively indicating a position of the target element within a tree representation of the target UI, a selected attribute of the plurality of attribute-value pairs having a target value. Automatically identifying the runtime instance of the target element comprises comparing the target value with a value of the selected attribute characterizing a candidate element of the runtime UI, the comparison performed according to a similarity threshold. Automatically identifying the runtime instance of the target element further comprises identifying the candidate element as the runtime instance of the target element according to a result of the comparison.

According to another aspect, a non-transitory computer-readable medium stores instructions which, when executed by at least one hardware processor of a computer system, cause the computer system, in response to receiving a robotic process automation (RPA) comprising a target element ID characterizing a target element of a target user interface (UI), to automatically identify a runtime instance of the target element within a runtime UI exposed by the computer system, the runtime instance of the target element identified according to the element ID. The instructions further cause the computer system to automatically carry out an operation that reproduces a result of an interaction of a human operator with the runtime instance of the target element, the operation determined according to the RPA script. The target element ID comprises a plurality of attribute-value pairs collectively indicating a position of the target element within a tree representation of the target UI, a selected attribute of the plurality of attribute-value pairs having a target value. Automatically identifying the runtime instance of the target element comprises comparing the target value with a value of the selected attribute characterizing a candidate element of the runtime UI, the comparison performed according to a similarity threshold. Automatically identifying the runtime instance of the target element further comprises identifying the candidate element as the runtime instance of the target element according to a result of the comparison.

BRIEF DESCRIPTION OF THE DRAWINGS

The foregoing aspects and advantages of the present invention will become better understood upon reading the following detailed description and upon reference to the drawings where:

FIG. 8-A shows an exemplary sequence of steps carried out by the RPA robot to identify a runtime target UI element according to some embodiments of the present invention.

FIG. 8-B shows an exemplary sequence of steps detailing a fuzzy search (step 306) in FIG. 8-A, according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. The term 'database' is used herein to denote any organized, searchable collection of data. Computer-readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
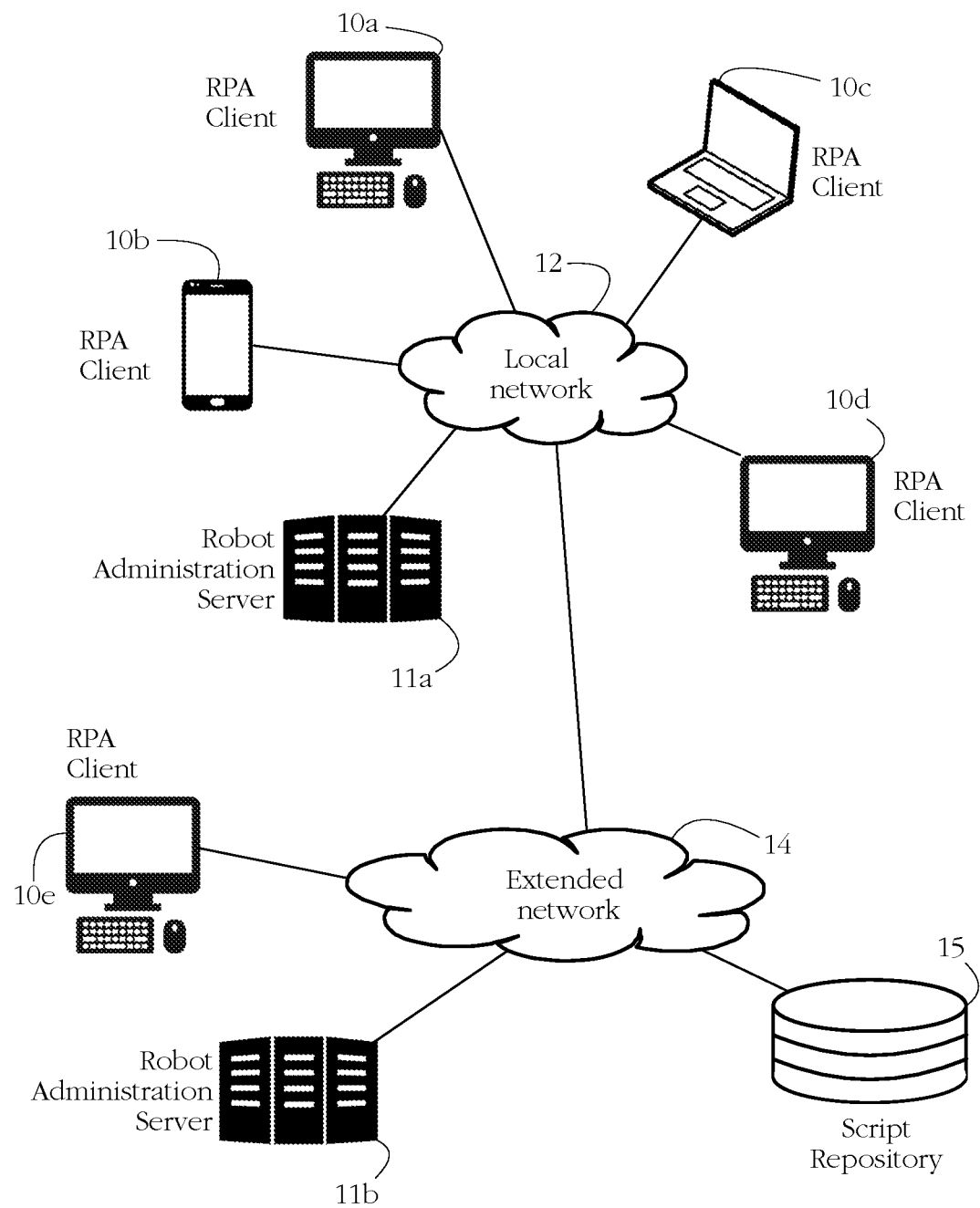
FIG. 1 shows an exemplary robotic process automation (RPA) system according to some embodiments of the present invention.

FIG. 1 shows an exemplary robotic process automation system according to some embodiments of the present invention. Each of a plurality of RPA clients 10a-e represents a computing device having at least a hardware processor, a memory unit and a network adapter enabling the respective RPA client to connect to a computer network and/or to other computing devices. Exemplary RPA clients 10a-e include personal computers, laptop and tablet computers, and mobile telecommunication devices (e.g., smartphones), among others. In an exemplary use case scenario, RPA clients 10a-d represent desktop computers belonging to an accounting or a human resources department of a company. The illustrated RPA clients 10a-d are interconnected by a local communication network 12, which may comprise a local area network (LAN). Clients 10a-d may further access an extended network 14 which may comprise a wide-area network (WAN) and/or the Internet. In the exemplary configuration of FIG. 1, RPA client 10e is connected directly to extended network 14. Such a client may represent a mobile computer, such as a laptop, tablet computer, or mobile telephone that connects to network 14 at various access points.

In a typical RPA scenario, a user such as an employee of a company uses a computer application (e.g., word processor, spreadsheet editor, browser, email application) to perform a repetitive task, for instance to issue invoices to various clients. To actually carry out the respective task, the employee performs a sequence of operations/actions, which is herein deemed a computer-implemented process. Exemplary operations forming a part of an invoice-issuing process may include opening a Microsoft Excel® spreadsheet, looking up company details of a client, copying the respective details into an invoice template, filling out template fields indicating the purchased items, switching over to an email application, composing an email message to the respective client, attaching the newly created invoice to the respective email message, and clicking a 'Send' button. RPA software executing on the employee's computer may automate the respective computer-implemented process by mimicking the set of operations performed by the respective human operator in the course of carrying out the respective task. Exemplary processes typically targeted for such automation include processing of payments, invoicing, communicating with clients (e.g., distribution of newsletters and/or product offerings), internal communication (e.g., memos, scheduling of meetings and/or tasks), payroll processing, etc.

Mimicking a human operation/action is herein understood to encompass reproducing the sequence of computing events that occur when a human operator performs the respective operation/action on the computer, as well as reproducing a result of the human operator's performing the respective operation on the computer. For instance, mimicking an action of clicking a button of a graphical user interface may comprise having the operating system move the mouse pointer to the respective button and generating a mouse click event, or may alternatively comprise toggling the respective GUI button itself to a clicked state, without moving the mouse pointer.

Figure 2:
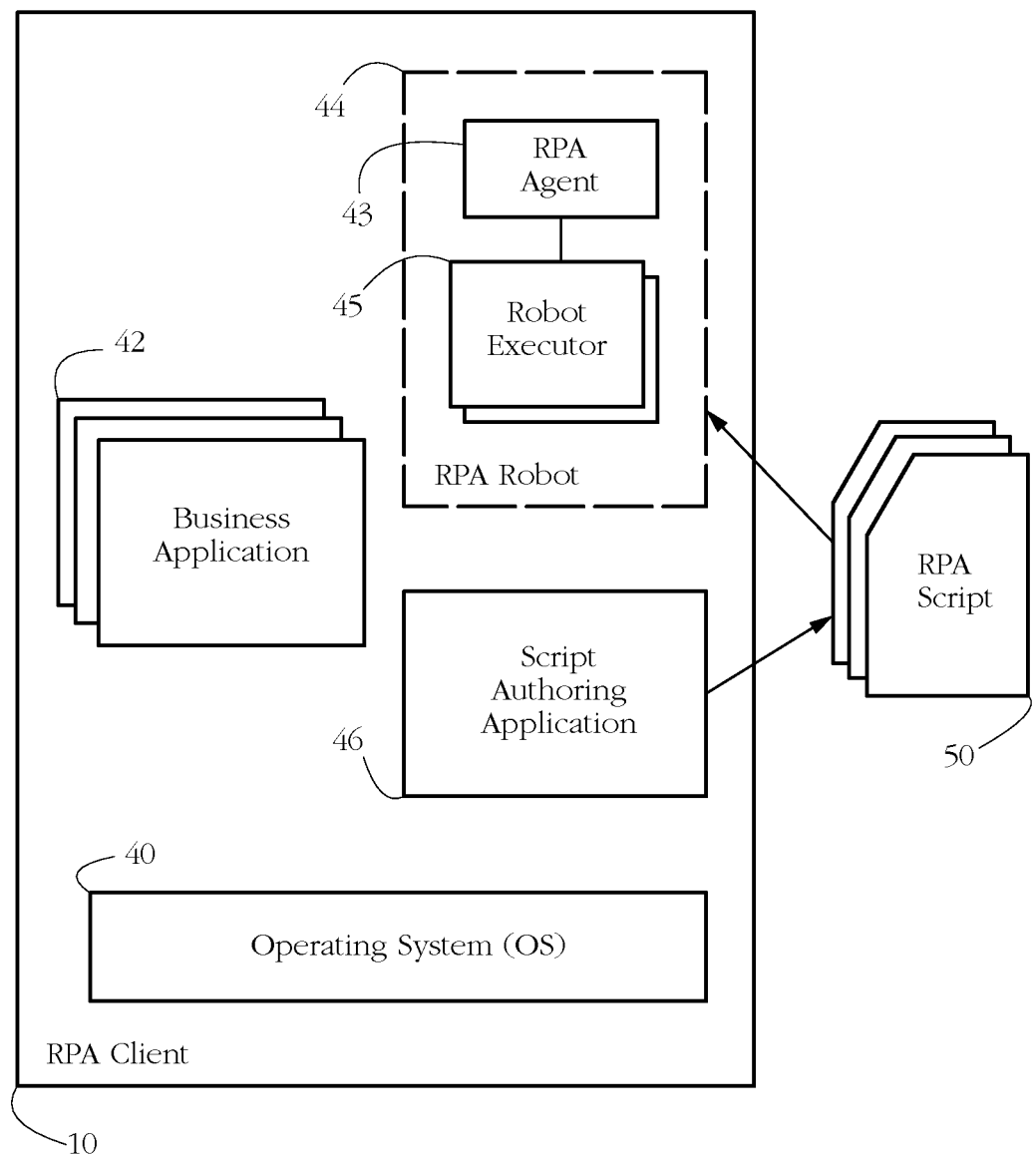
FIG. 2 shows exemplary software executing on an RPA client according to some embodiments of the present invention.

FIG. 2 shows exemplary software executing on an RPA client 10 according to some embodiments of the present invention. RPA client 10 may represent any of RPA clients 10a-e in FIG. 1. RPA client 10 executes an operating system (OS) 40, and a set of computer applications 42. OS 40 may comprise any widely available operating system such as Microsoft Windows®, MacOS®, Linux®, iOS®, or Android®, among others, comprising a software layer that interfaces between applications 42 and the hardware of RPA client 10. Applications 42 generically represent any computer program used by a human operator of RPA client 10 to carry out a task. Exemplary applications 42 include, among others, a word processor, a spreadsheet application, a graphics application, a browser, a social media application, and an electronic communication application. At least one application 42 is configured to expose a user interface (UI) that is targeted for automation as detailed below.

In some embodiments, RPA client 10 further executes an RPA robot 44 which comprises a set of interconnected computer programs that collectively implement an automation of a computer-implemented process. An exemplary RPA robot is constructed using a Windows Workflow Foundation Application Programming Interface from Microsoft®, Inc. In some embodiments, RPA robot 44 executes within a separate, dedicated virtual machine instantiated on RPA client 10.

Components of RPA robot 44 include an RPA agent 43 and a set of robot executors 45. Robot executors 45 are configured to receive an RPA script 50 indicating a sequence of operations (also known in the art as activities) that mimic the actions of a human operator carrying out a computer-implemented process, and to actually execute the respective sequence of operations on the respective client machine. RPA scripts 50 are typically process-specific, i.e., each distinct process is described by a distinct set of RPA scripts. An RPA script 50 may be formulated according to any computer-implemented data specification known in the art. In a preferred embodiment, RPA script 50 is encoded in a version of an extensible markup language (XML), but script 50 may also be formulated in a programming language such as C #, Visual Basic, Java, etc. Alternatively, RPA script 50 may be specified in an RPA-specific version of bytecode, or even as a sequence of instructions formulated in a natural language such as English, Spanish, Japanese, etc. In some embodiments, script 50 is pre-compiled into a set of native processor instructions (e.g., machine code).

In some embodiments, robot executor 45 comprises an interpreter (e.g., a just-in-time interpreter or compiler) configured to translate RPA script 50 into a runtime package comprising processor instructions for carrying out the operations described in the respective script. Executing script 50 may thus comprise executor 45 translating RPA script 50 and instructing a processor of RPA client 10 to load the resulting runtime package into memory and to launch the runtime package into execution.

In some embodiments, RPA agent 43 manages the operation of robot executors 45. For instance, RPA agent 43 may select tasks/scripts for execution by robot executor(s) 45 according to an input from a human operator and/or according to a schedule. Agent 43 may further configure various operational parameters of executor(s) 45. When robot 44 includes multiple executors 45, agent 43 may coordinate their activities and/or inter-process communication. RPA agent 43 may further manage communication between RPA robot 44 and other components of the RPA system illustrated in FIG. 1. Such components may execute on other RPA clients and/or a set of robot administration servers 11a-b. In one such example, servers 11a-b may operate a robot orchestrator service coordinating RPA activities across multiple client machines and enabling complex scheduling and/or license management. Servers 11a-b may further receive data from individual RPA robots indicating various intermediate values and/or results of executing RPA scripts. Such data may be used to generate activity reports, to enforce licensing agreements, and/or to mitigate malfunctions.

In some embodiments, RPA client 10 further executes a script authoring application 46 configured to enable a human operator of RPA client 10 to create RPA script 50 and thus effectively design a robot to perform a set of activities. Authoring application 46 may function like an integrated development environment (IDE), comprising a code editor and/or a user interface enabling the operator to interact with a set of tools for modeling a computer-implemented process. An exemplary authoring application may allow a user to select an application 42 and to indicate a desired manner of interacting with the respective application, e.g., to indicate a sequence of operations to be performed by robot 44. Exemplary operations include, for instance, opening a specific Excel® spreadsheet, reading data from a specific row/column of a data table, processing the respective data in a specific manner, clicking on a specific button, composing and sending an email message, navigating to a specific unified record location (URL), etc. In some embodiments, authoring application 46 outputs RPA scripts 50 in a format readable by RPA robot 44 (e.g., XML). RPA scripts 50 may be stored in a script repository 15 communicatively coupled to and accessible to RPA clients 10a-e via network 12 and/or 14 (see FIG. 1). In a preferred embodiment, script repository 15 is directly linked to robot administration server(s) 11a-b. Script repository 15 may be organized as a database, e.g., any structured data collection allowing a selective retrieval of scripts 50 according to a set of criteria.

A skilled artisan will appreciate that not all components illustrated in FIG. 2 need to execute on the same physical processor or machine. In typical RPA configurations, script development/robot design is carried out on one machine (commonly known in the art as the 'design side'). The resulting RPA script 50 is then distributed to multiple other users and machines for execution (usually known as 'runtime side' or simply 'runtime').

Figure 3:
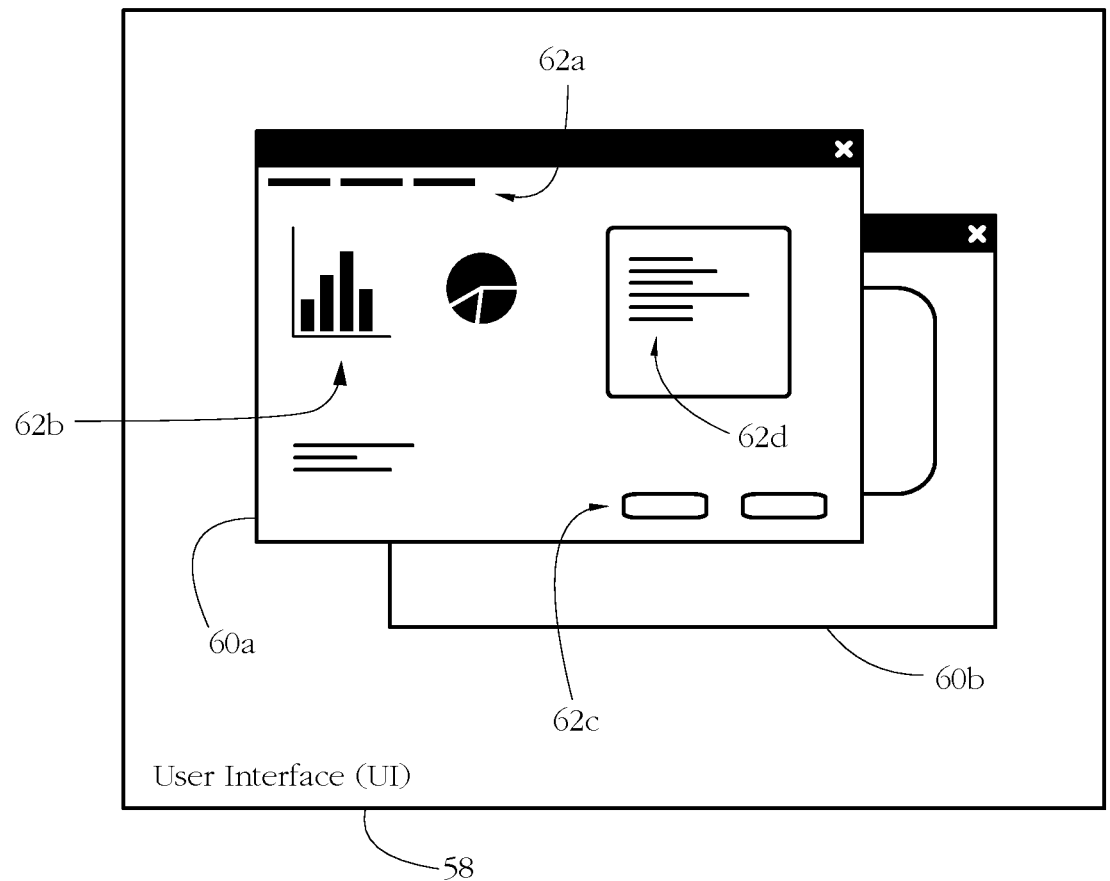
FIG. 3 shows an exemplary user interface (UI) comprising a plurality of UI elements according to some embodiments of the present invention.

FIG. 3 shows an exemplary user interface (UI) 58 according to some embodiments of the present invention. UI 58 may be exposed by any of the applications 42. A user interface is a computer interface that enables human-machine interaction, e.g., an interface configured to receive user input and to respond to the respective input. A common example of user interface is known as a graphical user interface (GUI), which enables human-machine interaction via a set of visual elements displayed to the user. Illustrative UI 58 has a set of exemplary windows 60a-b and a set of exemplary UI elements including a menu indicator 62a, an icon 62b, a button 62c, and a text box 62d. Other exemplary UI elements comprise, among others, a window, a label, a form, an individual form field, a toggle, a link (e.g., a hyperlink, hypertext, or a uniform resource identifier). UI elements may display information, receive input (text, mouse events), and/or control a functionality of software and/or the respective computer system.

Some UI elements are interactive in the sense that acting on them (e.g., clicking button 62c) triggers a behavior/reaction. Such behaviors/reactions are typically specific to the respective element or to a group of elements. For instance, clicking a save button produces a different effect than clicking a print button. The same keyboard shortcut (e.g., Ctrl-G) may have one effect when executed in one window/application, and a completely different effect when executed in another window/application. So, although the operation/action/activity is the same (executing a click, pressing a combination of keyboard keys, writing a sequence of characters, etc.), the result of the respective operation may depend substantially on the operand of the respective operation. An operand is herein defined as the UI element that is acted upon by a current operation such as a click or a keyboard event, or stated otherwise, the UI element selected to receive the respective user input. The terms 'target' and 'operand' are herein used interchangeably. Since UI element behaviors are element-specific, successful RPA may require unambiguously and correctly identifying operands for each scripted RPA activity.

Figure 4:
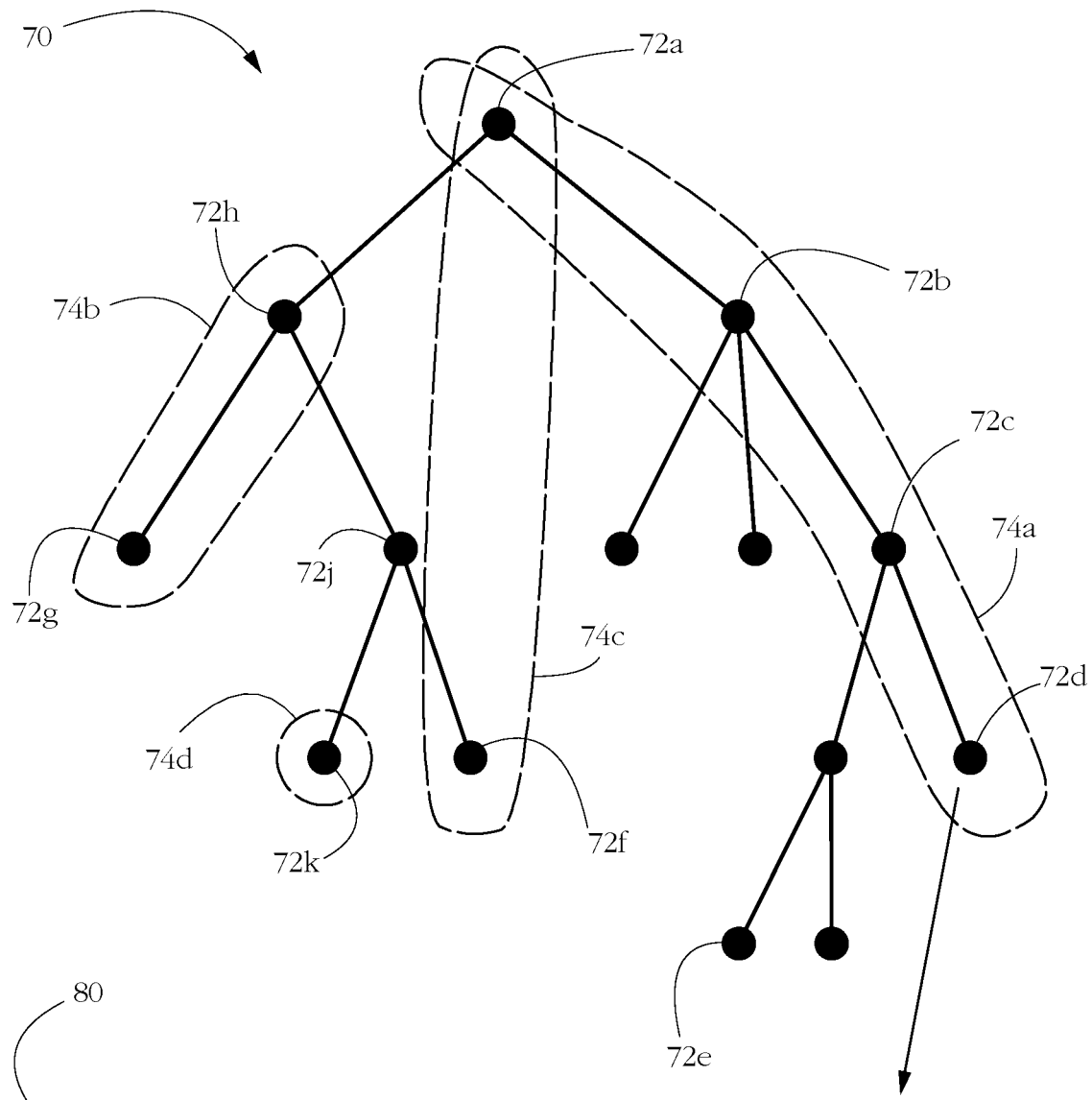
FIG. 4 shows an exemplary UI tree and an exemplary element ID characterizing a node of the UI tree according to some embodiments of the present invention.

In modern computing platforms, the operating system typically represents each user interface as a hierarchical data structure commonly known as a UI tree. An exemplary UI tree comprises a document object model (DOM) underlying a webpage rendered by a browser application. FIG. 4 shows an exemplary UI tree 70 having a plurality of nodes 72a-k. In some embodiments, each node 72a-k comprises an object representing a part of UI 58. In an exemplary GUI, a root node 72a may represent an entire GUI window. Its children nodes 72b and 72h may represent individual UI elements (e.g., text boxes, labels, form fields, buttons, etc.), groups of elements, distinct regions or blocks of the respective UI, etc. An intermediate node such as node 72b in FIG. 4 may represent a whole form, including all its input fields, labels and buttons. For instance, node 72b may represent the contents of a <form> or <fieldset> container of an HTML document. Another example of an intermediate node may represent a content of a <div> or <span> HTML container. Yet another example of intermediate node comprises contents of a header or footer of a document. End nodes such as 72d, 72e, 72f, 72g, and 72k (also known in the art as leaf nodes) are nodes that have no further children nodes, and may represent individual UI elements (e.g., a button, an individual label, an individual input field). In an example of a web browser UI, end nodes may represent individual images, hyperlinks, text paragraphs, etc.

In the following description, a set of nodes consisting exclusively of a selected node of the UI tree and of its descendants is herein deemed a subtree of the UI tree. The respective subtree is further deemed a subtree of an ancestor of the root node of the respective subtree. In the illustrative UI tree depicted in FIG. 4, nodes 72f-g-h-j-k form an exemplary subtree of node 72a, since node 72h is a descendant (child) of node 72a.

To enable a successful and ideally unambiguous identification by robot 44, some embodiments of the present invention represent each UI element by way of an element ID characterizing the respective UI element. An exemplary element ID indicates a location of a target node within UI tree 70, wherein the target node represents the respective UI element. For instance, the element ID may identify a target node/UI element as a member of a selected subset of nodes. The selected subset of nodes may form a genealogy, i.e., a line of descent through the UI tree wherein each node is either an ancestor or a descendant of another node. Exemplary genealogies 74a-d are illustrated in FIG. 4.

In some embodiments, the element ID comprises an ordered sequence of node indicators, the sequence tracing a genealogical path through the UI tree, the path ending in the respective target node/UI element. Each node indicator may represent a member of an object hierarchy of the respective UI, its position within the sequence consistent with the respective hierarchy. For instance, each member of the sequence may represent a descendant (e.g., child node) of the previous member, and may have the following member as a descendant (e.g., child node.) In a HTML example, an element ID representing an individual form field may indicate that the respective form field is a child of an HTML form, which in turn is a child of a specific section of a webpage, etc. The genealogy does not need to be complete—exemplary genealogy 74c comprises just the leaf and root node, but still identifies node 72f as a UI element displayed within the GUI window represented by root node 72a.

In one such example illustrated in FIG. 4, wherein an element ID 80 is expressed in a version of XML, each individual node indicator comprises an XML tag. Element ID 80 characterizing node 72d therefore may comprise a sequence of tags, the first tag representing a GUI window (node 72a), while the last tag represents the target node 72d itself (in this example, a button.) Intermediate tags of element ID 80 may represent nodes such as 72b and 72c, among others. Each tag may consist of a sequence of characters, the sequence book-ended by implementation-specific delimiters (in the current example, each tag begins with < and ends with />.) In FIG. 4, each tag is specified via a set of attribute-value pairs, which may indicate, for instance, a name and a type of UI element represented by the respective node, among others. The illustrated format of element ID 80 is provided only as an example; a skilled artisan will appreciate that there may be multiple other ways of representing a location of a specific node within a UI tree, beside a list of attribute-value pairs.

At runtime, software robot 44 may attempt to identify an operand/target of an action within a runtime instance of the target UI (i.e., within an instance of a user application executing on the runtime machine). In practice, identifying the operand comprises attempting to identify a runtime instance of a target UI element, herein deemed runtime target. Some embodiments attempt such identification according to the respective element's ID and/or according to other information such as an image of the respective UI element, a label displayed next to or on top of the respective UI element, etc. Matching element IDs may fail in situations wherein some characteristic features of the respective UI element have changed between design and runtime. To overcome such situations, some embodiments attempt a fuzzy (partial) match of the element ID, as shown in detail below.

Figure 5:
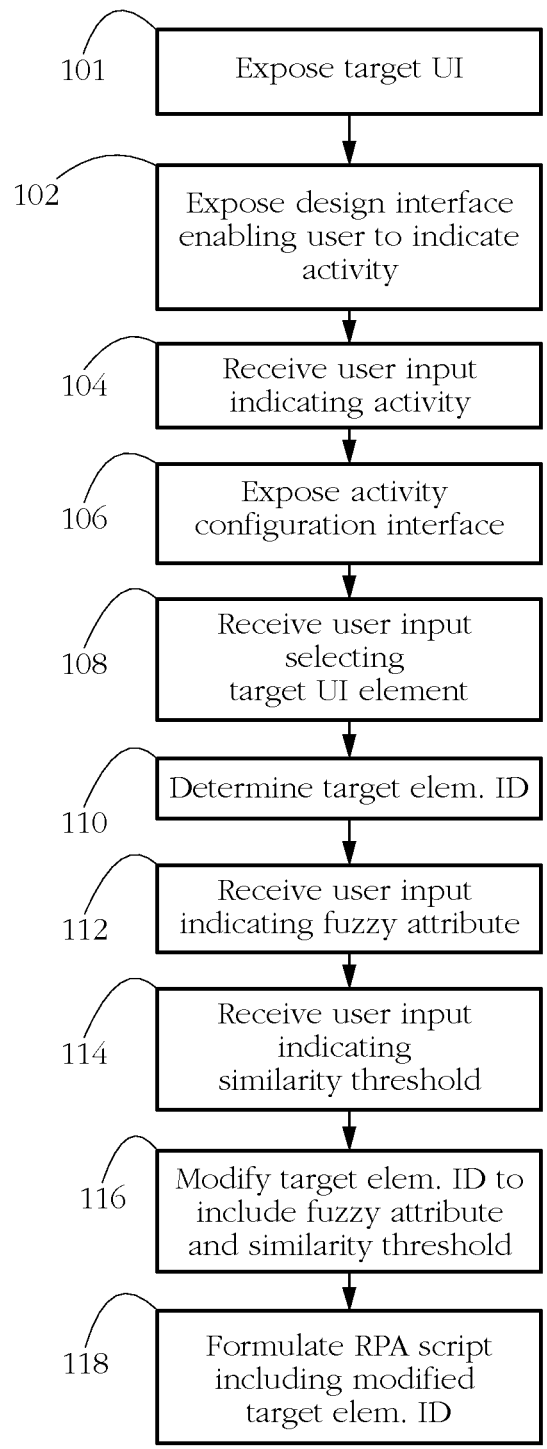
FIG. 5 shows an exemplary sequence of steps performed by a script authoring application according to some embodiments of the present invention.

FIG. 5 shows an exemplary sequence of steps performed by script authoring application 46 to enable target identification by fuzzy matching element IDs according to some embodiments of the present invention. A step 101 exposes a target UI, i.e., a design-side instance of a user interface of an application 42, which is the target of the current automation. Step 101 may comprise, for instance, invoking an instance of application 42. In a step 102, application 46 may expose a robot design interface (e.g., a GUI) enabling a user to indicate a desired activity to be performed by robot 44 on the exposed target UI. In some embodiments, the activities may be reached via a hierarchy of activity menus. Activities may be grouped according to various criteria, for instance, according to a type of computer application (e.g., MS Excel® activities, web activities, email activities), and/or according to a type of interaction (e.g., mouse activities, hotkey activities, data grabbing activities, form filling activities, etc.). A step 104 receives user input indicating the respective activity. For instance, step 104 may comprise intercepting a mouse click event and determining a menu item that the user has clicked on to select an activity. In a further step 106, application 46 may expose an activity configuration interface enabling the user to configure various options and/or parameters of the respective activity. One exemplary activity parameter is the operand/target UI element of the respective activity. In one example wherein the activity comprises a mouse click, the target UI element may be a button, a menu item, a hyperlink, etc. In another example wherein the activity comprises filling out a form, the target UI element may be the specific form field that should receive the respective text input. Application 46 may enable the user to indicate the target UI element in various ways. For instance, it may invite the user to select the target element from a menu/list of candidate UI elements. In a preferred embodiment, application 46 may expose an instance of the target UI (i.e., the UI of the computer application that robot 44 is supposed to interact with, for instance MS Excel®, a browser, an email program, etc.), and highlight a subset of UI elements within the respective UI, inviting the user to click on one to indicate a selection. In a step 108, application 46 may receive and process the user input indicating the selected target element, for instance by calling certain OS functions to detect the mouse click and identifying the clicked UI element.

Next, a step 110 may determine the element ID of the selected UI element. Step 110 may comprise parsing a source code (e.g., HTML) of the target UI, extracting and/or formulating a set of tags including attribute-value pairs.

A further sequence of steps 112-114 enables the designer to instruct software robot 44 to use fuzzy (i.e., approximate) matching when attempting to identify the runtime target. In some embodiments, in steps 112-114, script authoring application 46 may invite the user to indicate a fuzzy attribute and a similarity threshold for matching the respective attribute. A skilled artisan will appreciate that there may be many ways to acquire such input from a user. In a preferred embodiment, in response to the user indicating a target UI element, application 46 may expose a configuration GUI enabling the user to set various fuzzy matching attributes as shown below.

Figure 6:
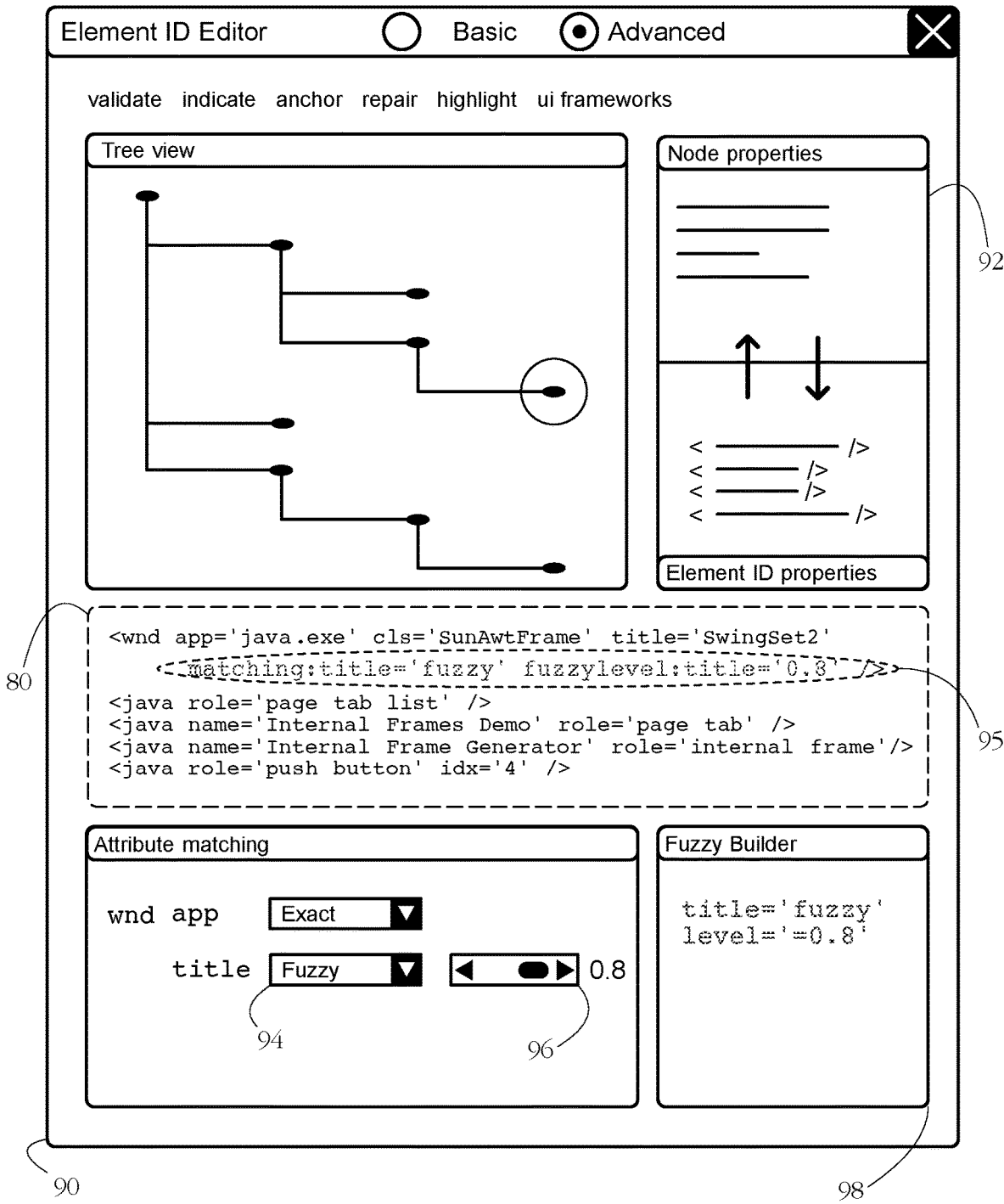
FIG. 6 illustrates an exemplary graphical user interface of a script authoring application according to some embodiments of the present invention.

FIG. 6 shows an example of such a configuration GUI according to some embodiments of the present invention. Configuration GUI 90 may comprise a window having various zones, for instance an area for displaying a tree view of the target UI, which allows the user to easily visualize the selected target UI element as a node in a tree representation of the target UI. GUI 90 may further display element ID 80, allowing the user to visualize currently defined tags, attributes and/or values characterizing the respective target UI element. Some embodiments may further include a tag builder pane 92 enabling the user to select which nodes/tags and/or which attributes of each node to include in element ID 80.

GUI 90 may further include an attribute matching pane enabling the user to set matching parameters for individual tags and/or attributes. In one example, in response to the user selecting (e.g., clicking) a tag from element ID 80, the attribute matching pane may display each attribute of the respective tag, and a set of inputs for configuring each attribute. In the example of FIG. 6, a dropdown menu 94 enables the user to indicate a matching method the robot should use for the respective attribute. Exemplary methods include exact and approximate matching methods. Exact matching typically requires that the runtime value of the respective attribute exactly match the design-time value. Approximate matching may only require a partial match between the design-time and runtime values of the respective attribute, and is typically applied to attributes of type text (i.e., character strings). Exemplary kinds of approximate matching include regular expressions and wildcard, among others. Another type of approximate matching, fuzzy matching, is described in detail below according to some embodiments of the present invention.

Fuzzy matching herein denotes a matching criterion wherein the design-time and runtime values of a selected attribute are allowed to differ by no more than a predetermined numerical threshold. The respective attribute is herein deemed a fuzzy attribute. Fuzzy matching may be applied to multiple fuzzy attributes. The amount of similarity/mismatch between two attribute values is herein called a similarity measure, while the threshold is called a similarity threshold, without loss of generality. The threshold is numerical, which is herein understood to denote a real number which may take any value within a pre-determined range, as opposed to a binary number which may only have one of two possible values (0 or 1 as in Boolean variables.). Stated otherwise, the similarity threshold quantifies a variable amount or degree of acceptable mismatch: the same two values of a fuzzy attribute may be considered to match according to a one value of the similarity threshold, and not to match according to another value of the similarity threshold.

In contrast to other approximate matching methods (e.g., regular expression matching), wherein two character strings are allowed to differ only in certain positions/characters while other characters are matched exactly, fuzzy matching allows any position/character to differ between the two strings. Another distinction is that while in other approximate matching methods, such as regular expressions and wildcard, the amount of mismatch between the two strings is typically not limited, in fuzzy matching it is capped at a pre-determined amount.

One of ordinary skill in the art will appreciate that the similarity measure may quantify an amount of similarity, as well as an amount of mismatch between two attribute values. Furthermore, in various embodiments, the similarity threshold may represent a maximum amount of mismatch or a minimum amount of similarity required for a match. The similarity measure may be expressed in various ways, for instance according to an inter-string distance known in the art as a string metric. One exemplary string metric known as the Levenshtein distance determines a count of operations necessary to transform one string into the other. Other inter-string distances known in the art include the Hamming distance and the Jaro-Winkler distance, among others.

Depending on the chosen manner of computing the similarity measure, the similarity threshold can have various interpretations. For instance, it may indicate a maximum count of characters that can differ between the two strings, or a fractional degree of mismatch calculated as a proportion of the total count of characters (e.g., combined string length). In some embodiments, the similarity threshold may be rescaled to a pre-determined interval, for instance between 0 and 1 or between 0 and 100, etc. In one example, a relatively high similarity threshold (e.g., close to 1 or 100%) indicates a requirement for an almost exact match, i.e., the value of the fuzzy attribute in the runtime target is only allowed to depart very slightly from the value of the respective attribute in the design-time target. In contrast, when the similarity threshold is relatively low (e.g., close to 0), almost any values of the respective fuzzy attribute are considered as matching.

Some embodiments of configuration GUI 90 allow adjusting the similarity threshold at design-time, for instance by way of a slider 96. Some embodiments may include a separate fuzzy builder pane 98 enabling the user to manually code matching parameters such as the fuzzy similarity threshold directly into the respective tag of element ID 80.

Multiple attributes of the same tag may be simultaneously selected for fuzzy matching. Distinct attributes may be matched to distinct degrees (e.g., by setting distinct values for the fuzzy similarity threshold.)

In response to receiving user input indicating at least one attribute for fuzzy matching, in a step 116 (FIG. 5), script authoring application 46 may encode the respective information into RPA script 50. In a preferred embodiment, step 116 comprises modifying the respective element ID to indicate the fuzzy matching parameters. Some embodiments use a fuzziness flag to earmark an attribute for fuzzy matching. In one such example, the fuzziness flag comprises a set of new attribute-value pairs added to the existing tag to indicate the attribute selected for fuzzy matching and to set the respective similarity threshold. One exemplary format is illustrated in FIG. 6 (fuzziness flag 95):

<wnd app='java.exe' cls='SunAwtFrame' title='SwingSet2' matching:title='fuzzy' fuzzylevel:title='0.8'/>, wherein the attributes matching:title and fuzzylevel:title were added to the original <wnd/> tag. The matching:title attribute has the value "fuzzy" to indicate that the value of the 'title' attribute of the current tag will be fuzzy-matched at runtime. The value of the fuzzylevel:title attribute indicates the desired fuzzy similarity threshold specified by the user (in this example, 0.8). One of ordinary skill in the art will understand that there may be many other ways of encoding a fuzziness flag earmarking a selected attribute for fuzzy matching.

Steps 102-116 (FIG. 5) may be repeated for each activity required as part of the designed computer-implemented process. A further step 118 outputs the robot's code to be used at runtime, for instance to a script file. RPA script 50 may be formulated in any computer-readable encoding known in the art, for instance in a version of XML or even compiled into a sequence of native processor instructions (e.g., machine code). For each activity/automation step, authoring application 46 may output to RPA script 50 an indicator of the respective activity (e.g., click, type into, etc.) and an encoding of element ID 80 representing the respective target UI element. In some embodiments, application 46 may further output to RPA script 50 a set of parameter values for configuring each activity, for instance using a set of attribute-value pairs. One exemplary parameter is a timeout threshold indicating a maximum amount of time robot 44 may spend attempting to identify a runtime instance of a target UI element.

Figure 7:
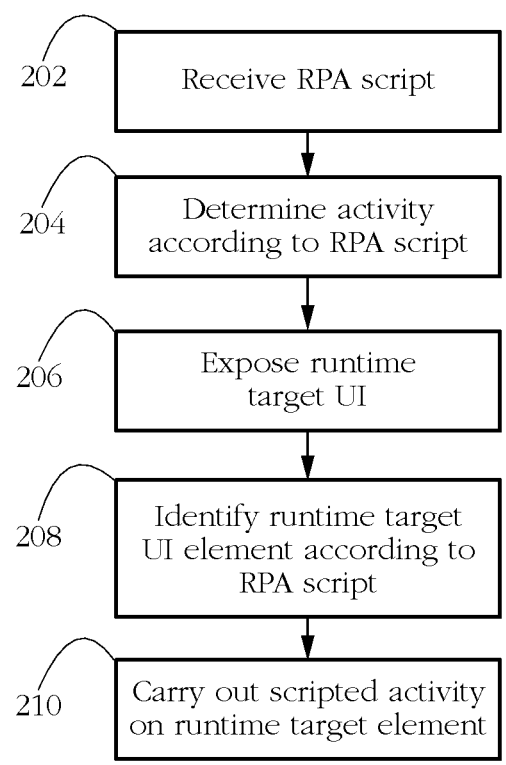
FIG. 7 shows an exemplary sequence of steps performed by an RPA robot according to some embodiments of the present invention.

Once the design phase of automation is complete, RPA script 50 may be transmitted to script repository 15 and/or distributed to other RPA clients for execution (see e.g., FIG. 1). FIG. 7 shows an exemplary sequence of steps carried out by RPA robot 44 at runtime. In response to receiving RPA script 50, a step 204 determines a type of activity to be performed according to a content of RPA script 50. Step 204 may further determine a target UI and/or a runtime application (e.g., MS Excel®, Google Chrome®, etc.) that the respective robot is configured to interact with according to RPA script 50. In a step 206, RPA robot 44 may expose the respective runtime UI, for instance by invoking an instance of the respective computer application on the local client machine. A further step 208 may automatically identify a runtime target, i.e., an operand for the respective activity according to information stored in RPA script 50. The operand comprises the element that robot 44 is configured to act upon (e.g. to click, to enter some text into, to grab the contents of, etc.) Stated otherwise, the operand is a runtime instance of a target UI element identified by the designer of robot 44; ideally, the runtime target is an exact copy of the design-time target but differences may occur for various reasons. The execution of step 208 is described in detail below. In response to a successful identification of a runtime target UI element, a step 210 may automatically carry out the scripted activity, i.e., interact with the respective UI element as indicated in RPA script 50.

FIG. 8-A shows an exemplary sequence of steps performed by robot 44 to automatically identify the runtime target UI element (step 208 in FIG. 7) according to some embodiments of the present invention. The illustrated method attempts to identify the runtime target only according to the element ID characterizing the respective target ID. Alternative methods may combine element ID matching with other types of information such as image and text data, but such methods are generally beyond the scope of the present disclosure. Also, for simplicity and clarity, the illustrated flowchart assumes that robot 44 only tries to match element IDs either exactly or using fuzzy matching. Other matching strategies (e.g., using regular expressions, wildcards, etc.) are beyond the scope of the present disclosure.

In a step 302, robot 44 may start the search by designating the root node of the runtime UI tree as a candidate runtime target. A step 304 may then advance to the next tag of element ID 80. A step 306 may search subtrees of the current candidate node for nodes matching the current tag. Some embodiments identify all matching nodes and place them on a new list of candidates. Step 306 is detailed below in relation to FIG. 8-B. The illustrated algorithm associates a distinct list of candidate nodes with each distinct tag of element ID 80. When the list of candidates associated with the current tag is non-empty, i.e., there are nodes matching the current tag, a sequence of steps 310-312 selects a node from the list as the new current candidate node and removes it from the list. A step 314 checks whether there are still tags of element ID 80 to be matched. When no, indicating that the search is complete, a step 316 reports a successful identification of the runtime target in the current candidate node.

When there are further tags to match, robot 44 returns to step 304 to continue the search with trying to match the next tag of element ID 80, with the observation that now the robot may search for matching nodes only within subtrees of the currently selected candidate node (i.e., recursive search). When all tags have been matched, a step 316 may identify the selected candidate node as the runtime target.

The algorithm may be modified so that step 316 returns multiple potential runtime targets, when more than one element of the runtime UI matches element ID 80. For instance, step 316 may return all candidate nodes from the current candidate list. Such results are more likely to occur when the similarity threshold is set at a value (e.g., similarity threshold close to 0) which allows for substantial differences between the design-time and runtime values of a fuzzy attribute. Multiple potential runtime targets may be sorted, for instance according to a similarity measure, as shown below.

In some embodiments of the present invention, when step 306 cannot find any candidate nodes matching the current tag within subtrees of the currently selected candidate node, some embodiments may backtrack to a previously-matched tag (steps 318-320), and return to step 308 to check whether there are any candidate nodes left of the list associated with the respective tag. Stated otherwise, when one search fails, RPA robot 44 will try to search for the runtime target within subtrees of another candidate node identified in an earlier search iteration.

FIG. 8-B shows an exemplary sequence of steps detailing the search for nodes matching the current tag (step 306 in FIG. 8-A). In a step 332, robot 44 may select a node from a subtree of the current candidate node. Next, a step 334 may check whether attributes of the selected node match non-fuzzy attributes of the current tag. In an exemplary embodiment (see e.g., FIG. 6 and associated description), robot 44 may identify fuzzy and non-fuzzy attributes by parsing the current tag in search of the "matching: [attribute_name]=fuzzy" declarations. For each non-fuzzy attribute, an exact match may require that the candidate's value of the respective attribute is identical to the target UI element's (design-time) value of the respective attribute. When the selected node does not match the non-fuzzy attributes, indicating that the respective node cannot be a candidate for runtime target, robot 44 may select another node, etc.

When the selected node matches non-fuzzy attributes of the current tag, a sequence of steps 336-338 may determine whether the selected node is a fuzzy match for the current tag. A step 336 may compute a similarity measure indicative of a (non-binary) degree of similarity between the currently selected node and the design-time target UI element. In some embodiments, the similarity measure is a number which may take any value between a pre-determined minimum (e.g., 0 indicating no similarity) and a pre-determined maximum (e.g., 1 or 100% indicating identity).

For string-type attributes, an exemplary similarity measure may be computed according to an inter-string distance such as a Levenshtein measure or another edit distance. The resulting score may be normalized to the interval [0,1] for instance using the formula:

$$S = \frac{(L_C + L_T) - D}{(L_C + L_T)}, \qquad [1]$$

wherein S denotes the similarity measure, D denotes the Levenshtein distance, $L_C$ denotes the string length of the candidate's value, while $L_T$ denotes the string length of the value of the respective attribute in the design-time target UI element. An exemplary Levenshtein distance between two strings evaluates a count of operations required to transform one string into the other. In one such example, deleting or inserting a character counts as 1 point, while substituting a character counts as 2 points. Distance D is then calculated by adding all the points. Scores evaluated using formula [1] are high when the runtime and design-time values are very similar to each other, and low when they are not.

Some embodiments pre-process the attribute values before calculating the similarity measure. In this sense, some embodiments do not match the attribute values themselves, but pre-processed attribute values instead. Exemplary pre-processing operations include removal of blank spaces and/or other special characters (e.g., $%&?!/+ etc.), transforming all characters to lowercase, etc. In another example of pre-processing, when an attribute value contains multiple text tokens (e.g., multiple words), the respective tokens are re-ordered, for instance alphabetically according to the initial of each token. Such manipulations are specifically targeted at situations wherein a text attribute of a UI element changes between design time and runtime in a manner which preserves semantics. For instance, a window name may change from 'Application Window' to 'window of application'. Comparing the 'raw' values of the respective attribute according to a Levenshtein distance may lead to the false conclusion that the two names have nothing in common. Pre-processing by re-ordering tokens may produce a different verdict, since it would amount to comparing 'application window' to 'application of window', which are clearly similar. Some embodiments compute an aggregate similarity measure by combining a score evaluated for the 'raw' values with a score evaluated for the pre-processed values of the respective fuzzy attributes. The two individual scores may receive different weights, for instance the score corresponding to the pre-processed values may be de-emphasized with respect to the other.

In some embodiments, a step 338 compares the calculated similarity measure with the similarity threshold specified for the respective fuzzy attribute. A similarity measure exceeding the respective similarity threshold may indicate a runtime candidate which is very similar to the target UI element at least according to the current tag of element ID 80. Therefore, the respective candidate may be considered to match the target UI element in the respective fuzzy attribute, even when the values of their respective attribute are not identical.

Some embodiments allow multiple fuzzy attributes within the same tag. Each such fuzzy attribute may have a distinct fuzzy similarity threshold. For instance, in the exemplary tag:

<wnd cls='Notepad' title='Untitled—Notepad' matching: cls='fuzzy' fuzzylevel:cls='0.8' matching:title='fuzzy' fuzzylevel:title='0.5'/>, both the 'cls' and 'title' attributes are fuzzy, and the similarity threshold for the 'cls' attribute is higher than that of the 'title' attribute. In such situations, it may happen that the similarity measure for one attribute exceeds the respective threshold, while the similarity measure for another attribute falls below the threshold required for a match. Some embodiments do not consider a candidate element to be a match unless similarity measures calculated for all fuzzy attributes exceed the respective similarity thresholds. Stated otherwise, a candidate is not considered a fuzzy match for the target UI element unless all its values are sufficiently similar to the values of the respective attributes of the target UI element.

When the currently selected node is considered a fuzzy match for the target UI element, in a step 340 the respective candidate is added to the list of candidates associated with the current tag. In some embodiments, for each candidate, robot 44 further stores the value of the similarity measure(s) calculated for the respective candidate. When element ID 80 has multiple fuzzy attributes, some embodiments calculate an aggregate similarity measure for each candidate, for instance as a weighted average of similarity measures determined for individual fuzzy attributes. After all eligible nodes in the subtree of the current candidates have been considered, the list of candidates associated with the current tag will have all nodes sufficiently similar to the current tag to be considered for the next level of the search. Some embodiments further sort the candidate list according to similarity measure, so that when robot 44 selects candidates from the list (see e.g., step 310 in FIG. 8-A), it selects the most similar candidates first, thus accelerating the search and potentially uncovering a runtime target which is most similar to the design-time target.

Figure 9:
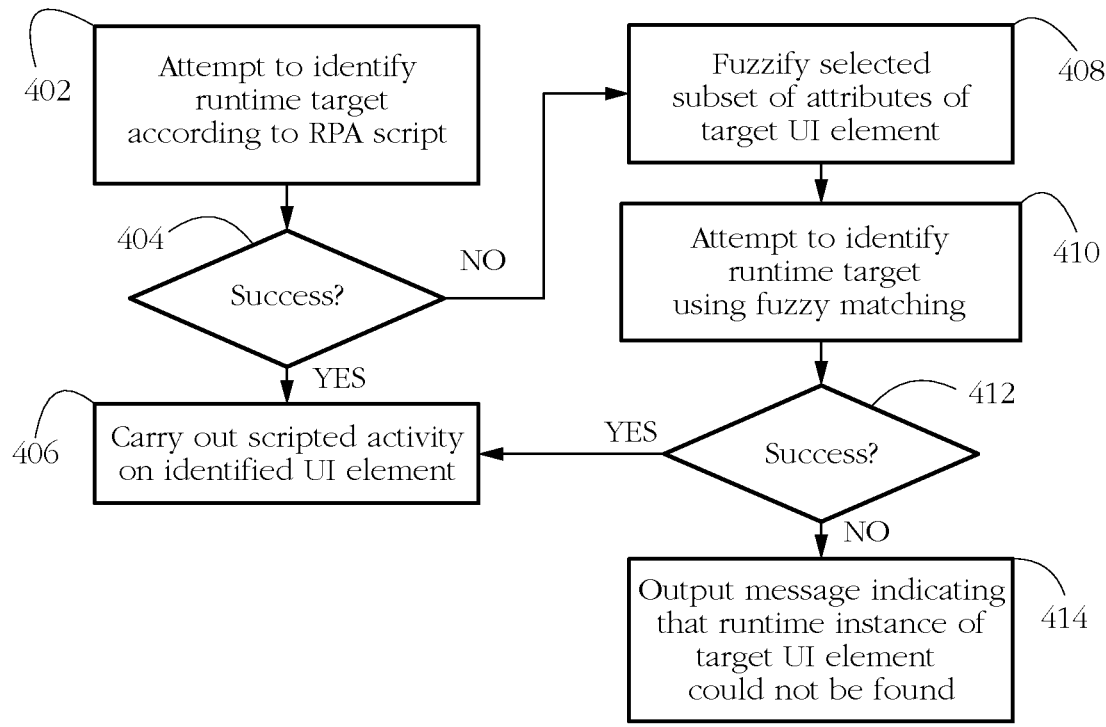
FIG. 9 shows an exemplary sequence of steps carried out by the software robot in an alternative embodiment of the present invention.

The fuzzy matching systems and methods described above may be modified and adapted to other RPA situations. FIG. 9 shows an exemplary sequence of steps performed by robot 44 in an alternative embodiment of the present invention. The illustrated method applies, for instance, to a situation wherein RPA script 50 does not include fuzzy attributes. Such a situation may arise in a system wherein script authoring application 46 lacks some of the features described above, for instance features enabling the robot designer to indicate fuzzy attributes and/or similarity thresholds. Upon receiving RPA script 50, robot 44 may attempt to find a runtime target exactly matching all attributes of target element ID 80 specified in RPA script 50.

When the search for an exact match fails, instead of abandoning with an error message, some embodiments may re-attempt to find the runtime target using fuzzy matching instead. In a step 408, robot 44 may fuzzify a selected subset of attributes of element ID 80, for instance by inserting a 'matching: [attribute_name]=fuzzy' attribute and/or an associated similarity threshold into a selected tag. Robot 44 may attempt fuzzification only for pre-determined categories of attributes, for instance window names, class names, or any other attribute prone to changing between design time and runtime. Such categories may be determined by experimentation on real user data. The same applies to selecting an optimal similarity threshold. Setting the threshold too low may lead to false target identifications, while setting it too high may not provide sufficient flexibility to the fuzzy matching algorithms. An optimal value may be found, for instance, by collecting a corpus of real-world examples of instances where an attribute has changed between design time and runtime and select the optimum similarity threshold according to the corpus.

In a step 410, robot 44 may attempt to identify the runtime target using fuzzy matching. Step 410 may comprise applying a method such as the one illustrated in FIGS. 8-A-B and described in detail above. Only when fuzzy matching is not successful, a step 414 may output an error message indicating that the runtime target could not be found.

Figure 10:
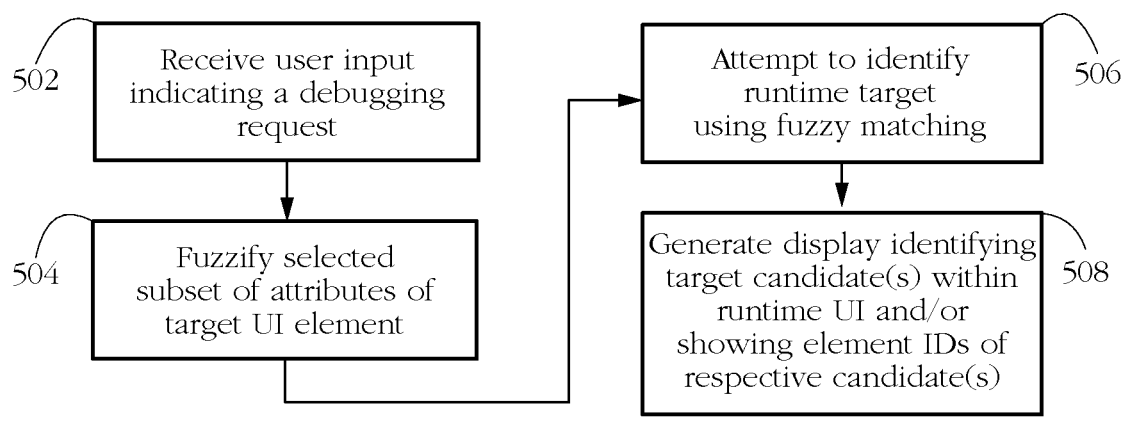
FIG. 10 shows an exemplary sequence of steps carried out by a software robot and/or script authoring application in an alternative embodiment of the present invention.

FIG. 10 shows another exemplary manner of using fuzzy matching according to some embodiments of the present invention, namely as a debugging feature. The illustrated sequence of steps may be executed by RPA robot 44 and/or script authoring application 46 (i.e., either at design time or at runtime). In one such example, upon failing to identify the runtime target, robot 44 may display a pop-up window with a message announcing the failure, the pop-up window further including an interactive element (e.g., a button) that allows the user to run a debugging routine. In a step 502 robot 44 receives a user input indicating a debugging request, for instance an indicator that the user has clicked the 'Debug' button. In response, a step 504 may fuzzify selected attributes of the target UI element, for instance by editing element ID 80 to insert a 'matching: [attribute_name] =fuzzy' declaration. In some embodiments, the intention of such fuzzification is to show to the user a few candidate UI elements that are quite similar to the intended target, and in the process identify a cause of the failure to find the runtime target. To achieve the goal of identifying UI elements similar to the target, some embodiments may identify a reason for the failed match. For instance, some embodiments may record which attributes of a candidate were matched successfully and which were not. In step 504, some embodiments fuzzify at least the attributes that did not match, to help the user understand whether the cause of the failure was an unexpected change in the value of the respective attribute occurring between design time and runtime. In one such example, the target is represented by the element ID:

<wnd app='notepad.exe' title='New Document'>
<ctrl role='panel' name='Panel2'>
<ctrl role='button' name='OK'>

However, between design time and runtime, the name of the target panel has changed from 'Panel2' to 'Panel8'. A conventional search algorithm using exact matching of attributes will therefore fail to find the runtime target. Some embodiments may record the fact that the only attribute that failed to match is the 'name' attribute within the second tag of the element ID, and fuzzify the respective attribute. The new fuzzified element ID may read:

<wnd app='notepad.exe' title='New Document'>
<ctrl role='panel' name='Panel2' matching:name='fuzzy' fuzzylevel:name='0.0'>
<ctrl role='button' name='OK'>

A step 506 may run the fuzzy matching algorithm on the fuzzified element ID (e.g., method detailed in FIGS. 8-A-B.) A further step 508 may show to the user a result of the fuzzy matching algorithm, comprising a set of candidate runtime UI elements partially matching the original attributes of the target. For each candidate, some embodiments further display the element ID characterizing the respective candidate, to help the user understand the cause of the initial failure to identify the runtime target. In the example above, the user will be shown the candidate element having 'Panel8' as the name of the target panel.

As shown in the example above, to reveal candidate UI elements which are similar to a selected target element, some embodiments may set the similarity threshold to a substantially low value (e.g. lower than 0.1, or even 0). Such settings may produce candidates that match the target in all but the selected fuzzy attribute. For instance, making a 'window name' attribute fuzzy with a similarity threshold close to 0 will return UI windows having various names but matching all other attributes of the target element.

Figure 11:
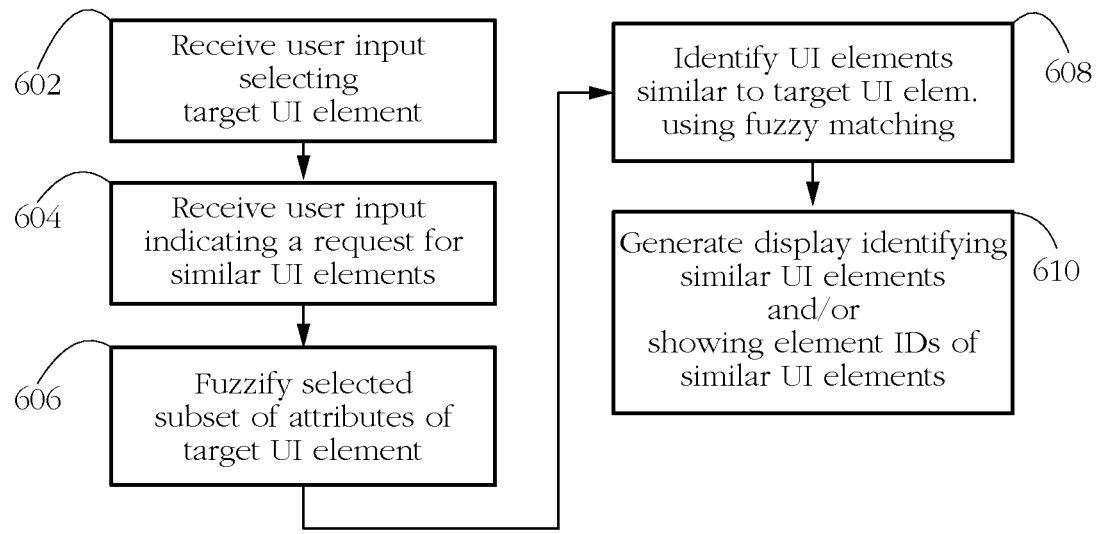
FIG. 11 shows another exemplary sequence of steps carried out by a script authoring application and/or software robot in an alternative embodiment of the present invention.

FIG. 11 shows another exemplary alternative embodiment, configured to enable a user to visualize elements which are similar to a selected target element. Such functionality may be useful in the RPA design process, since knowing which elements are substantially similar may steer the designer towards a design strategy that will specifically prevent the robot from mistakenly identifying the wrong target. For instance, such knowledge may encourage the designer to formulate element ID 80 to include attributes which more clearly distinguish the intended target from other runtime UI elements. In response to the user selecting the target element/operand of an RPA activity, some embodiments may display an interactive element (e.g. a button) enabling the user to request a display of similar elements. A step 604 may receive input indicating that the user has activated the respective function (e.g., clicked the respective button). In a sequence of step 606-608, script authoring application 46 may fuzzify a set of attributes of the target, and run a fuzzy matching algorithm on the fuzzified element ID. Step 608 may produce a set of UI elements of the design-time target UI that are substantially similar to the selected target, for instance they differ from the selected target in a limited number of attributes. In some embodiments, the similarity threshold for the fuzzified attributes may be set to very low (e.g., close to 0) to allow the user to visualize all elements that match other attributes except the fuzzified ones.

Figure 12:
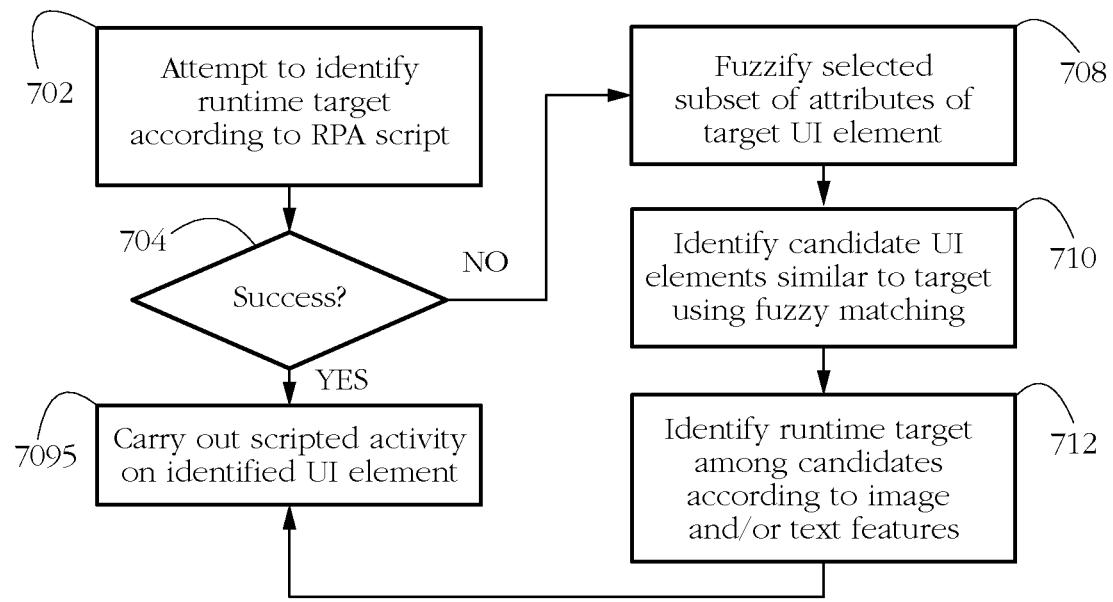
FIG. 12 shows yet another exemplary sequence of steps carried out by a software robot in an alternative embodiment of the present invention.

Another potential application of fuzzy matching in RPA is illustrated by the exemplary sequence of steps in FIG. 12. Some embodiments rely on the observation that attribute matching may be used in conjunction with other methods for automatically identifying the runtime target. In one such example, in response to a failure to identify the runtime target according to the element ID, robot 44 may attempt to identify the runtime target according to other features, for instance according to a position of the target within the runtime UI, according to a position of the target relative to other objects, according to an image of the target and/or according to a text displayed on top of or next to the respective target. However, since such methods are typically a lot more computationally expensive than attribute matching, ideally they would be applied to a pre-selected subset of UI candidate elements. In some embodiments, robot 44 may produce such a candidate set in a sequence of steps 708-710, by fuzzifying some selected attributes of the target and applying fuzzy matching. Some embodiments may then apply complementary target-identifying methods on a subset of UI elements which are pre-selected by fuzzy matching as likely candidates for the runtime target by being substantially similar to the design-time target.

Figure 13:
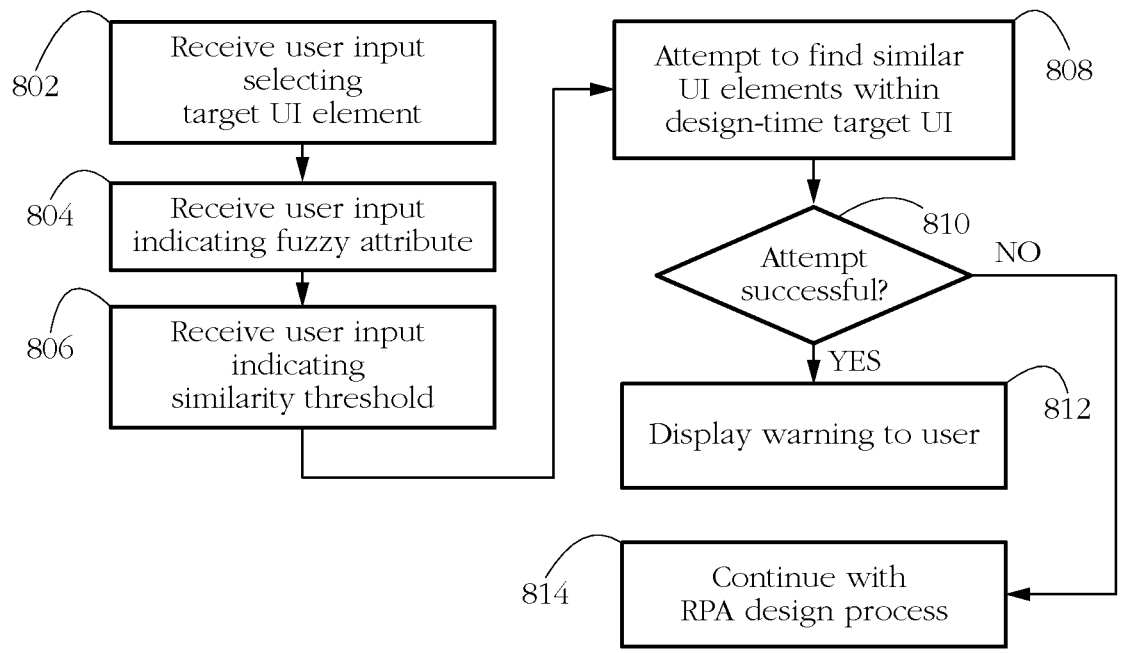
FIG. 13 shows yet another exemplary sequence of steps carried out by a script authoring application in an alternative embodiment of the present invention.

FIG. 13 shows yet another exemplary sequence of steps carried out in an embodiment that uses fuzzy matching to facilitate robot design. The illustrated sequence of steps may be executed for instance by script authoring application 46. In response to receiving user input selecting a target UI element, fuzzy attribute and similarity threshold, a step 808 may attempt to apply fuzzy matching (e.g., method illustrated in FIG. 8) to identify UI elements similar to the selected target within the design-time target UI. When the attempt is successful, a step 812 displays a warning to the user. Some embodiments rely on the observation that a successful fuzzy match occurring within the design-time UI indicates a design fault (e.g., similarity threshold set too low) or a problem of the user interface itself (e.g., multiple UI elements having identical features). Any of these situations are likely to cause problems at runtime. An embodiment as illustrated in FIG. 13 may facilitate robot design by pro-actively detecting potential problems.

Figure 14:
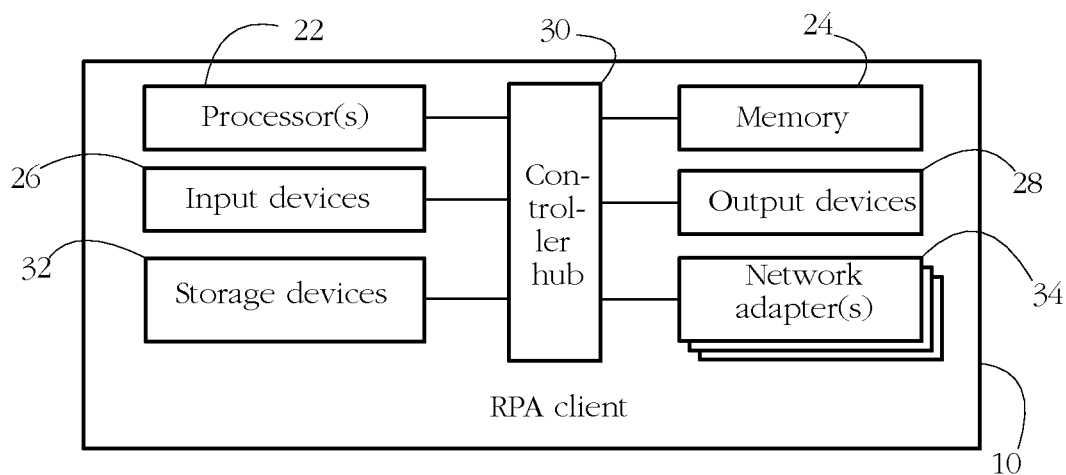
FIG. 14 illustrates an exemplary embodiment of a computing device configured to carry out methods described herein.

FIG. 14 shows an exemplary hardware configuration of a computing device programmed to execute some of the methods described herein. The respective computing device may represent any of RPA clients 10a-e in FIG. 1, for instance a personal computer as illustrated in FIG. 14. Other computing devices such as mobile telephones, tablet computers, and wearables may have slightly different configurations. Processor(s) 22 comprise a physical device (e.g. microprocessor, multi-core integrated circuit formed on a semiconductor substrate) configured to execute computational and/or logical operations with a set of signals and/or data. Such signals or data may be encoded and delivered to processor(s) 22 in the form of processor instructions, e.g., machine code. Processor(s) 22 may include a central processing unit (CPU) and/or an array of graphics processing units (GPU).

Memory unit 24 may comprise volatile computer-readable media (e.g. dynamic random-access memory—DRAM) storing data/signals/instruction encodings accessed or generated by processor(s) 22 in the course of carrying out operations. Input devices 26 may include computer keyboards, mice, and microphones, among others, including the respective hardware interfaces and/or adapters allowing a user to introduce data and/or instructions into RPA client 10. Output devices 28 may include display devices such as monitors and speakers among others, as well as hardware interfaces/adapters such as graphic cards, enabling the respective computing device to communicate data to a user. In some embodiments, input and output devices 26-28 share a common piece of hardware (e.g., a touch screen). Storage devices 32 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 34 enable the respective computing device to connect to an electronic communication network (e.g., networks 12 and 14 in FIG. 1) and/or to other devices/computer systems.

Controller hub 30 generically represents the plurality of system, peripheral, and/or chipset buses, and/or all other circuitry enabling the communication between processor(s) 22 and the rest of the hardware components of RPA client 10. For instance, controller hub 30 may comprise a memory controller, an input/output (I/O) controller, and an interrupt controller. Depending on hardware manufacturer, some such controllers may be incorporated into a single integrated circuit, and/or may be integrated with processor(s) 22. In another example, controller hub 30 may comprise a northbridge connecting processor 22 to memory 24, and/or a southbridge connecting processor 22 to devices 26, 28, 32, and 34.

It will also be apparent to one of ordinary skill in the art that aspects of the invention, as described above, may be implemented in various forms of software, firmware, and hardware, or a combination thereof. For example, certain portions of the invention may be described as specialized hardware logic that performs one or more functions. This specialized logic may include an application specific integrated circuit (ASIC) or a field programmable gate array (FPGA). The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

The exemplary systems and methods described above facilitate RPA operations by improving the automatic identification of activity targets, i.e., user interface elements acted upon by robotic software. Target identification poses a substantial technical problem, because in typical RPA applications, the target user interface (e.g., an e-commerce webpage, an accounting interface, etc.) is developed and maintained independently of the robot designed to interact with the respective interface. Therefore, the functionality and/or appearance of the target UI may change without the knowledge of RPA developers. Successful RPA may therefore depend upon a robust method of identifying an activity target, method which is relatively insensitive to variations in the design of the target user interface.

When designing robotic software (a stage of automation commonly known as design-time), the RPA developer invokes an instance of the target UI and indicates a target element and an activity to be performed on the respective target element. For instance, the developer may indicate a button of the target UI and configure the robot to click on the respective button. In another example, the developer may indicate an input field and configure the robot to type some text into the respective input field. In yet another example, the developer may indicate a text box of the user interface and configured the robot to grab the content of the respective text box. The resulting robot code may include an indicator of the target element and an indicator of the respective activity. The robot code may then be distributed to RPA clients.

In another stage of automation commonly known as runtime, a client machine may execute the respective robot, which may attempt to interact with another, client-side instance of the target UI. However, the client-side UI may not be identical to the design-side UI. When the target UI comprises a web interface, and especially when the respective robot is designed to interact with a complex web site, the respective user interface may change, even multiple times in the course of a day. Web developers of the respective web site may tweak the appearance, for instance changing a position of a button, changing the composition of a menu, and/or changing the color scheme, fonts, and size of various elements. Robotic software may therefore have to successfully identify a target element, even when the appearance of the interface has changed.

Some conventional RPA systems identify a runtime target by attempting to find an element of the runtime UI that exactly matches an element ID of the design-time target element. The element ID is specified according to the source code or data structure underlying the respective user interface (for instance, the HTML code that specifies the appearance and content of a webpage.) However, such systems and methods may fail when the name or other attribute of the respective element unexpectedly changes. Such changes may occur quite frequently, especially since a substantial proportion of web documents are currently being generated dynamically, and various aspects of a web document are controlled algorithmically.

In contrast to such conventional approaches, some embodiments of the present invention identify the runtime target using a fuzzy matching approach wherein the element ID of the runtime target is allowed to differ to some extent from the element ID of the intended target. Some embodiments may therefore correctly identify the runtime target even when the name and/or other attribute has changed slightly between design time and runtime. The allowed degree of mismatch between the design and runtime attributes may be adjustable by the user at design time. At runtime, the RPA robot may identify a set of candidate UI elements similar to the sought-after target, and determine a similarity measure indicative of a degree of similarity between each candidate and the target. Some embodiments then select the candidate most similar to the design-time target as the runtime target and apply the scripted operation/activity to it.

To instruct the RPA robot to use fuzzy matching at runtime, some embodiments fuzzify the conventional element ID by inserting into it some additional attributes/vales that indicate a selected fuzzy attribute (e.g., element name) and/or a similarity threshold indicative of a maximum allowed degree of mismatch in the values of the respective fuzzy attribute. The RPA robot may still apply exact matching to non-fuzzy attributes.

It will be clear to one skilled in the art that the above embodiments may be altered in many ways without departing from the scope of the invention. Accordingly, the scope of the invention should be determined by the following claims and their legal equivalents.

What is claimed is:

1. A method comprising employing at least one hardware processor of a computer system to:
in response to receiving a robotic process automation (RPA) script comprising a target element ID characterizing a target element of a target user interface (UI), automatically identify a runtime instance of the target element within a runtime UI exposed by the computer system, the runtime instance of the target element identified according to the element ID; and
automatically carry out an operation that reproduces a result of an interaction of a human operator with the runtime instance of the target element, the operation determined according to the RPA script;
wherein the target element ID comprises a plurality of attribute-value pairs collectively indicating a position of the target element within a tree representation of the target UI, a selected attribute of the plurality of attribute-value pairs having a target value; and
wherein automatically identifying the runtime instance of the target element comprises:
comparing the target value with a value of the selected attribute characterizing a candidate element of the runtime UI, the comparison performed according to a similarity threshold; and
identifying the candidate element as the runtime instance of the target element according to a result of the comparison.

2. The method of claim 1, wherein comparing the target value with the value of the selected attribute characterizing the candidate element comprises:
determining a numerical similarity measure indicative of an amount of similarity between the target value and the other value of the selected attribute characterizing the candidate element; and
comparing the similarity measure to a limit determined according to the similarity threshold.

3. The method of claim 2, wherein the similarity measure is determined according to a string metric evaluating a distance between the target value and the value of the selected attribute characterizing the candidate element.

4. The method of claim 1, wherein the similarity threshold is encoded in the RPA script, the method further comprising determining the similarity threshold according to the RPA script.

5. The method of claim 4, wherein the similarity threshold is encoded in the target element ID, the method further comprising determining the similarity threshold according to the target element ID.

6. The method of claim 1, wherein the target element ID further comprises a fuzziness flag earmarking the selected attribute for the comparison, the method further comprising identifying the selected attribute according to the target element ID.

7. The method of claim 1, wherein the target value comprises a name of a UI window displaying the target element.

8. The method of claim 1, wherein the target value comprises a name of the target element.

9. The method of claim 1, wherein the target value comprises a name of a group of UI elements including the target element.

10. The method of claim 1, wherein the interaction comprises an item selected from a group consisting of performing a mouse click on the runtime instance of the target element, pressing a specific combination of keyboard keys, writing a sequence of characters into the runtime instance of the target element, grabbing an on-screen image of the runtime instance of the target element, and grabbing a text displayed by the runtime instance of the target element.

11. The method of claim 1, wherein the target element comprises an item selected from a group consisting of a UI window, a menu, a button, a text area, and a form field.

12. A computer system comprising at least one hardware processor configured to:
in response to receiving a robotic process automation (RPA) script comprising a target element ID characterizing a target element of a target user interface (UI), automatically identify a runtime instance of the target element within a runtime UI exposed by the computer system, the runtime instance of the target element identified according to the target element ID; and automatically carry out an operation that reproduces a result of an interaction of a human operator with the runtime instance of the target element, the operation determined according to the RPA script;

wherein the target element ID comprises a plurality of attribute-value pairs collectively indicating a position of the target element within a tree representation of the target UI, a selected attribute of the plurality of attribute-value pairs having a target value; and wherein automatically identifying the runtime instance of the target element comprises:

comparing the target value with a value of the selected attribute characterizing a candidate element of the runtime UI, the comparison performed according to a similarity threshold; and identifying the candidate element as the runtime instance of the target element according to a result of the comparison.

13. The computer system of claim 12, wherein comparing the target value with the value of the selected attribute characterizing the candidate element comprises:

determining a numerical similarity measure indicative of an amount of similarity between the target value and the value of the selected attribute characterizing the candidate element; and comparing the similarity measure to a limit determined according to the similarity threshold.

14. The computer system of claim 13, wherein the similarity measure is determined according to a string metric evaluating a distance between the target value and the value of the selected attribute characterizing the candidate element.

15. The computer system of claim 12, wherein the similarity threshold is encoded in the RPA script, the method further comprising determining the similarity threshold according to the RPA script.

16. The computer system of claim 15, wherein the similarity threshold is encoded in the target element ID, the method further comprising determining the similarity threshold according to the target element ID.

17. The computer system of claim 12, wherein the target element ID further comprises a fuzziness flag earmarking the selected attribute for the comparison, the method further comprising identifying the selected attribute according to the target element ID.

18. The computer system of claim 12, wherein the target value comprises a name of a UI window displaying the target element.

19. The computer system of claim 12, wherein the target value comprises a name of the target element.

20. The computer system of claim 12, wherein the target value comprises a name of a group of UI elements including the target element.

21. The computer system of claim 12, wherein the interaction comprises an item selected from a group consisting of performing a mouse click on the runtime instance of the target element, pressing a specific combination of keyboard keys, writing a sequence of characters into the runtime instance of the target element, grabbing an on-screen image of the runtime instance of the target element, and grabbing a text displayed by the runtime instance of the target element.

22. The computer system of claim 12, wherein the target element comprises an item selected from a group consisting of a UI window, a menu, a button, a text area, and a form field.

23. A non-transitory computer-readable medium storing instructions which, when executed by at least one hardware processor of a computer system, cause the computer system to:

in response to receiving a robotic process automation (RPA) script comprising a target element ID characterizing a target element of a target user interface (UI), automatically identify a runtime instance of the target element within runtime UI exposed by the computer system, the runtime instance of the target element identified according to the element ID; and automatically carry out an operation that reproduces a result of an interaction of a human operator with the runtime instance of the target element, the operation determined according to the RPA script;

wherein the target element ID comprises a plurality of attribute-value pairs collectively indicating a position of the target element within a tree representation of the target UI, a selected attribute of the plurality of attribute-value pairs having a target value; and wherein automatically identifying the runtime instance of the target element comprises:

comparing the target value with a value of the selected attribute characterizing a candidate element of the runtime UI, the comparison performed according to a similarity threshold; and identifying the candidate element as the runtime instance of the target element according to a result of the comparison.

* * * * *